United States Patent
Tokura et al.

(10) Patent No.: US 6,686,036 B1
(45) Date of Patent: *Feb. 3, 2004

(54) MATERIAL FOR CASING FOR ACOUSTIC EQUIPMENT AND CASING FOR ACOUSTIC EQUIPMENT FABRICATED THEREFROM

(75) Inventors: Kunihiko Tokura, Saitama (JP); Masaru Uryu, Chiba (JP); Masayuki Kamite, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 08/982,898

(22) Filed: Dec. 2, 1997

(30) Foreign Application Priority Data

Dec. 2, 1996 (JP) .......................................... P08-322008

(51) Int. Cl.$^7$ ................................................. B32B 5/16
(52) U.S. Cl. ........................ 428/323; 428/324; 428/326; 428/327; 428/403; 428/407; 428/363; 181/148; 181/150; 181/151
(58) Field of Search ................................ 428/407, 403, 428/323, 324, 326, 327, 339, 363, 313.5; 264/115, 109, 122; 427/212; 181/151, 148, 150

(56) References Cited

U.S. PATENT DOCUMENTS 5,067,583 A * 11/1991 Hathaway .................... 181/151
5,620,642 A * 4/1997 Kamite et al. .............. 264/115

FOREIGN PATENT DOCUMENTS

EP          0 516 513 A2     12/1992

OTHER PUBLICATIONS

Patent Abstracts of Japan, vol. 16, No. 263, Jun. 15, 1992 & JP 04 058697 A (Kuraray Co. Ltd.), Feb. 25, 1992.
Derwent Publications Ltd., week 7609 (Database WPI), AN 76–15955x—XP002058016 & JP 51 009 013 A (Moriya KK), Jan. 19, 1976.
Derwent Publications Ltd., week 9030 (Database WPI), AN 90–227751—XP002058017 & JP 02 155 940 A (Kojima Press Kogyo), Jun. 15, 1990.

* cited by examiner

Primary Examiner—Merrick Dixon
(74) Attorney, Agent, or Firm—Sonnenschein, Nath & Rosenthal LLP

(57) ABSTRACT

A casing for an acoustic equipment formed mainly of a filler and a thermosetting or thermoplastic resin. The filler is comprised of a cellulose-based powdered material, such as wooden powders obtained on crushing a wooden material and an powdered material smaller in size and harder than the cellulose-based powdered material. The powdered material is secured or deposited under a pre-set pressure on the surface of the cellulose-based powdered material.

27 Claims, 2 Drawing Sheets

MATERIAL FOR CASING FOR ACOUSTIC EQUIPMENT AND CASING FOR ACOUSTIC EQUIPMENT FABRICATED THEREFROM

BACKGROUND OF THE INVENTION

1. Field of the Invention

This invention relates to a material for a casing for an acoustic equipment and the casing for the acoustic equipment. More particularly, it relates to a material for a casing for an acoustic equipment containing a cellulose-based powdered material and the casing for the acoustic equipment.

2. Description of Related Art

In an acoustic equipment represented by television, stereo system, radio cassette recorder or headphone, developments for improving its sound quality are proceeding. In particular, it is desired to improve an output sound pressure, distortion factor or flatness, among acoustic properties for acoustic equipments, such as a speaker or a headphone system.

In the above-described acoustic equipments, various physical properties of the acoustic equipments, such as a speaker box or a housing for a headphone system, are thought to be crucial as factors influencing the above-mentioned acoustic properties. If the sound wave is produced as a result of actuation of the acoustic equipments, the casing thereof undergoes resonant vibrations due to the produced sound wave. The audible sound outputted by the acoustic equipments is deteriorated in sound quality due to the resonant vibrations.

For overcoming these inconveniences, it may be contemplated to use a material of high tenacity having a moderately large internal loss in the casing for the acoustic equipment for improving an output sound pressure, distortion factor or flatness. Wooden plates, such as lauan plates, or particle boards, obtained on coating an adhesive on fine wooden chips for forming into a plate, have been used to this purpose.

However, these plate materials, formed into plates, are limited in degree of freedom as to the outer shape, and hence are limited in usage. Since the process of assembling the plate materials formed into a desired shape, is required, productivity is necessarily lowered.

For overcoming these difficulties, there is known a casing for an acoustic equipment fabricated by injection molding a thermoplastic resin. The materials used for forming a casing for an acoustic equipment may be enumerated by composite materials obtained on mixing an inorganic filler to polypropylene (PP) and a general-purpose plastic materials, such as ABS resins. The inorganic fillers mean powders formed of mica, talc and calcium carbonate and so forth.

The casing for an acoustic equipment is increased in tenacity as a casing by the inorganic fillers. However, if the inorganic fillers are used, the internal loss is increased such that the casing is inferior to the above-mentioned wooden casing as to the output sound quality of the equipment. If the ABS resin is used in place of PP, resonant vibrations are produced in the casing of the acoustic equipment because of the small internal loss, thus generating distortion in the output sound of the equipment. Thus, the casing cannot be said to be optimum as the casing for the acoustic equipment.

Meanwhile, if the casing for the acoustic equipment is formed of wood, the output sound produced is of good sound quality. As the material for the casing of the acoustic equipment, a mixture of cellulose-based fillers, such as wooden powders or husks of grains, with a resin, is used for producing the sound quality comparable to that obtained with the use of a wooden material. The cellulose-based fillers are surface-processed, such as with phenol, for improving dispersion with respect to resin. However, as compared to the above-mentioned generic inorganic fillers, the cellulose-based fillers cannot be said to have sufficient lubricating properties. Thus, the amount of the cellulose-based fillers that can be added to the resin is limited, with the result that the material of the casing for the acoustic material cannot be improved in tenacity.

If a speaker is driven with a signal of a pre-set level, the casing of the acoustic equipment containing the cellulose-based filler undergoes resonant vibrations by vibrations imparted to the speaker. The result is that playback sound pressure frequency characteristics of the speaker is not stable but undergoes fluctuations. This is not desirable because the distortion is increased by resonant vibrations of the casing for the acoustic equipments.

With the casing for the acoustic equipments employing the cellulose-based fillers, the surface of the casing becomes fluffy because the cellulose-based fillers are of a fibrous structure. The result is that not only the casing is unsatisfactory in appearance but also the speaker cannot be said to be optimum in output sound quality.

In a casing for an acoustic equipment, employing the cellulose-based fillers, only resins with lower melting temperatures, such as PP or vinyl chloride (PVC), can be used because the cellulose-based filler is poor in thermal resistance. That is, the casing for the acoustic equipment has a drawback that the usable resin type is limited.

When the cellulose-based filler is mixed and molded with the resin, lignin or pyroligneous acid is produced, as a result of which the casing containing the cellulose-based filler undergoes corrosion.

SUMMARY OF THE INVENTION

It is therefore an object of the present invention to provide a material for a casing for an acoustic equipment which resolves the above-mentioned problems.

It is another object of the present invention to provide a casing for an acoustic equipment which resolves the above-mentioned problems.

In one aspect, the present invention provides a material for a casing of an acoustic equipment mainly composed of a filler and a thermosetting resin, wherein the filler is comprised of a cellulose-based powdered material on the surface of which is immobilized a powdered material harder and smaller in particle size than the cellulose-based powdered material.

In another aspect, the present invention provides a material for a casing of an acoustic equipment mainly composed of a filler and a thermoplastic resin, wherein the filler is comprised of a cellulose-based powdered material on the surface of which is immobilized a powdered material harder and smaller in particle size than the powdered material.

In still another aspect, the present invention provides a casing of an acoustic equipment obtained on molding a starting material mainly composed of a filler and a thermosetting resin, wherein the filler is comprised of a cellulose-based powdered material on the surface of which a powdered material harder and smaller in particle size than the cellulose-based powdered material is deposited under a pre-set pressure.

In yet another aspect, the present invention provides a casing of an acoustic equipment obtained on molding a starting material mainly composed of a filler and a thermoplastic resin, wherein the filler is comprised a cellulose-based powdered material on the surface of which a powdered material harder and smaller in particle size than the cellulose-based powdered material has been deposited under a pre-set pressure.

DESCRIPTION OF THE INVENTION

A material for a casing for an acoustic equipment and the casing for the acoustic equipment employing this material will be explained in detail.

Figure 1:
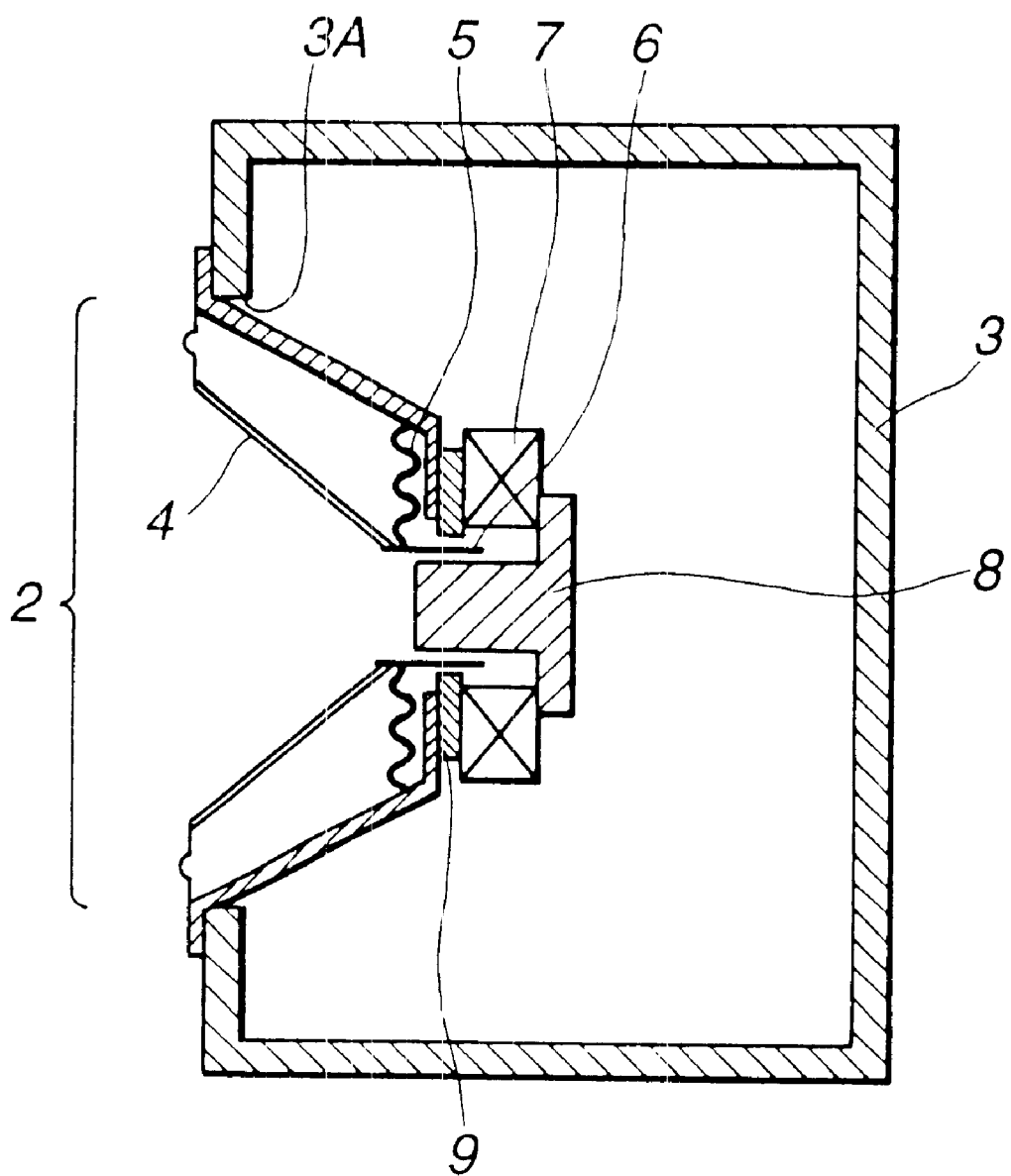
FIG. 1 is a schematic cross-sectional view for illustrating the structure of a speaker employing a casing for an acoustic equipment according to the present invention.

The material for the casing of the acoustic equipment is used as a casing for a acoustic equipment, such as a speaker device 1. In FIG. 1, the speaker device 1 is roughly made up of a speaker unit 2 for generating the sound pressure and an outer casing 3 encircling the speaker unit 2 substantially in its entirety. This speaker unit 2 includes a vibration plate 4, a damper 5 for supporting the vibration plate 4, a voice coil 6 for vibrating the vibration plate 4, a magnet 7, a pole piece 8 and a magnetic circuit plate 9. With this speaker device 1, desired current corresponding to a signal supplied from an external acoustic equipment, such as an amplifier, connected to a tuner or a disc player, as a signal source, is supplied from outside to the vice coil 6, for driving the vibration plate 4 by the magnet 7, pole piece 8 and the magnetic circuit plate 9.

The outer casing 3 of the above-described speaker device 1 has the speaker unit 2 housed therein and is formed with an aperture 3A via which to expose the vibration plate 4 of the speaker unit 2 to outside. The outer casing 3 is molded from the above-described material for the casing of the acoustic equipment.

In this material for the casing for the acoustic equipment, the cellulose-based powder material is such a material mainly containing cellulose. The cellulose-based powdered material may be enumerated by wooden powders and husks of cereals.

The wooden powders are produced by crushing a starting wooden material to wooden powders for processing which are then processed by a ball mill. Since the wooden powders for processing are obtained on crushing the starting wooden material, its surface presents angular portions, protruded portions or cilium-like whiskers. If the wooden powders for processing are processed by a ball mill for pulverization, the number of these angular portions, protruded portions or cilium-like whiskers gradually diminishes as a result of the action of attrition by balls of the ball mill, such that the wooden powders for processing are tuned into wooden powders with a high bulk density as the cellulose-based powdered material. These wooden powders are particles with an indefinite outer shape and are partially spherically-shaped or nearly spherically-shaped particles. It is noted that the particle size of the wooden powders as the cellulose-based powdered material has no pertinence to possible improvement in the acoustic properties which will be explained subsequently.

In the present material for the acoustic equipment, the fine powdered material is harder and smaller in particle size than the above-mentioned cellulose-based powdered material. Specified examples of the fine powdered material include inorganic materials, such as titanium oxide, mica and calcium carbonate.

For processing the wooden powders to the above shape, it is also possible to mix the wooden powders for processing with the fine powdered material in a mixer such that the fine powdered material will exert a pre-set impact on the wooden powders for processing.

The fine powdered material is affixed to the surface of the above-mentioned cellulose-based powdered material. Since the fine powdered material is smaller in particle size than the cellulose-based powdered material, it is affixed to substantially the entire surface of the cellulose-based powdered material. The cellulose-based powdered material is coated in this manner by the fine powdered material such that there is little possibility for lignin or pyroligneous acid to be expelled from inside.

If affixed to the surface of the cellulose-based powdered material, this fine powdered material affords thermal resistance and resistance against chemicals to the cellulose-based powdered material. That is, the fine powdered material sheathing the surface of the cellulose-based powdered material prevents the heat or chemicals from reaching the cellulose-based powdered material.

When affixed to the surface of the cellulose-based powdered material, the fine powdered material is immobilized by the external thrusting pressure. This pressure is the thrusting force applied from outside the surface of the cellulose-based powdered material and may be exemplified by that applied by mechanical means and that generated on pulverization. In the embodiment of the present invention, immobilization means affixture by a thrusting force from outside the surface which is sufficient to prevent exfoliation and which is achieved without resorting to chemical processing or adhesion.

For immobilizing the fine powdered material on the surface of the cellulose-based powdered material, such a device capable of applying an external thrusting force on the cellulose-based powdered material is employed. For example, a ball mill for pulverization or a dry ball mill, used for producing the cellulose-based powdered material, is used. By mixing the above-mentioned cellulose-based powdered material and the fine powdered material together by the above devices, the fine powdered material becomes affixed to the cellulose-based powdered material for producing the above-mentioned filler.

The filler, thus formed, is mixed with a thermoplastic or thermosetting resin to give a material for a casing for an acoustic equipment.

The thermoplastic or thermosetting resin may be any of those customarily used and may be enumerated by PP, ABS and PVC. The thermoplastic or thermosetting resin may be kneaded together with a filler to give a material for a casing for an acoustic equipment. The material for a casing for an acoustic equipment is molded by, for example, an injection molding device, to a desired ultimate shape as the casing for the acoustic equipment such as the outer casing 3 of the speaker device 1 shown in FIG. 1.

The materials for the casing for the acoustic equipment according to the present invention and the casing for the acoustic equipment prepared therefrom were actually produced and characteristics thereof were evaluated. Here, Examples 1 to 9 were fabricated and Comparative Examples 1 to 7 were also fabricated for comparison sake.

EXAMPLE 1

Preparation of Material for Casing for Acoustic Equipment

In Example 1, a material for the casing for the acoustic equipment was produced as explained hereinbelow. First, a chip material (wooden chips) was used as a starting wooden material and crushed by mechanical impact. The crushed material, obtained on mechanical impact and crushing, was sorted depending on the size for obtaining crushed wooden powders for processing having a size not larger than 150 meshes.

Next, the crushed wooden powders for processing were ground by a dry ball mill to give wooden powders. The specified grinding conditions for the dry ball mill included using balls formed of ceramics, surface temperature of the crushed wooden powders for processing of 90 to 120° C. and the temperature of the main body portion of the mill of not higher than 80° C.

On being contacted with balls during grinding, the crushed wooden powders for processing were mechanically crushed, ground and pulverized so that angular portions, projecting portions or the cilium-shaped whiskers on the surface were removed. The result is that the crushed wooden powders for processing were trimmed to an overall rounded shape to give wooden powders with increased bulk density. The wooden powders, thus produced, were sorted depending on the particle size and the fine powdered material formed of inorganic pigments is immobilized on the surface of the sorted wooden powders. In this Example 1, titanium oxide is used as the inorganic material. For immobilization, the wooden powders and titanium oxide were kneaded together using the dry mill used for grinding. This immobilizes titanium oxide for covering substantially the entire surface of the wooden powders to form the filler from the wooden powders and titanium oxide.

To 100 parts by weight of the ABS resin (manufactured by NIPPON GOSEI GOMU KK under the trade name of ABS10) were kneaded 5 parts by weight of the above filler to produce a material for a casing for an acoustic equipment of Example 1.

Fabrication of the Casing for the Acoustic Equipment

Using the material for a casing for an acoustic equipment of Example 1, a sample of a casing for an acoustic equipment of Example 1 was fabricated. As a sample of the casing for an acoustic equipment of Example 1, a sample 1 which is 10 mm in width, 1 mm in thickness and 15 mm in length was molded. For molding the sample 1, the molding pressure, molding temperature, temperature of a nozzle part, temperature of a forward portion, temperature of a mid portion and the temperature of the rear portion, were set to 80 kg/cm$^2$, 220° C., 200° C., 210° C., 190° C. and 180° C., respectively. After molding, the sample 1 was dried at 90° C.

EXAMPLE 2

A material for a casing for an acoustic material of Example 2 was fabricated in the same way as in Example 1 except kneading the ABS resin and the above filler at a mixing ration of the ABS resin to the filler of 100 parts by weight of the ABS resin to 10 parts by weight of the filler. Similarly, using this material for the casing for the acoustic equipment of Example 2, a sample 2 was fabricated as a sample of the casing for the acoustic equipment of Example 2.

EXAMPLE 3

A material for a casing for an acoustic material of Example 3 was fabricated in the same way as in Example 1 except kneading the ABS resin and the above filler at a mixing ration of the ABS resin to the filler of 100 parts by weight of the ABS resin to 20 parts by weight of the filler. Similarly, using this material for the casing for the acoustic equipment of Example 3, a sample 3 was fabricated as a sample of the casing for the acoustic equipment of Example 3.

EXAMPLE 4

A material for a casing for an acoustic material of Example 4 was fabricated in the same way as in Example 1 except kneading the propylene (manufactured by TOKUYAMA-SHA under the trade name of MS670) and the above filler at a ratio of 10 parts of the above filler to 100 parts of polypropylene.

Using the material for the casing for the acoustic equipment of Example 4, a sample 4 was manufactured as a sample of the casing for the acoustic equipment of Example 4. The sample 4 was manufactured by molding in the same way as the sample 1 except setting the molding pressure to 50 kg/cm$^2$ and the molding temperature of 200° C.

EXAMPLE 5

A material for a casing for an acoustic material of Example 5 was fabricated in the same way as in Example 4 except kneading polypropylene and the above filler at a mixing ratio of polypropylene to the filler of 100 parts by weight of polypropylene to 30 parts by weight of the filler. Similarly, using this material for the casing for the acoustic equipment of Example 5, a sample 5 was fabricated as a sample of the casing for the acoustic equipment of Example 5.

EXAMPLE 6

A material for a casing for an acoustic material of Example 6 was fabricated in the same way as in Example 4 except kneading polypropylene and the above filler at a mixing ratio of polypropylene to the filler of 100 parts by weight of polypropylene to 50 parts by weight of the filler. Similarly, using this material for the casing for the acoustic equipment of Example 6, a sample 6 was fabricated as a sample of the casing for the acoustic equipment of Example 6

EXAMPLE 7

A material for a casing for an acoustic material of Example 7 was fabricated in the same way as in Example 1 except fabricating the above filler using mica as an inorganic pigment and kneading polypropylene manufactured by TOKUYAMA-SHA under a trade name of MS670 and the above filler at a mixing ratio of polypropylene to the filler of 100 parts by weight of polypropylene to 10 parts by weight of the filler. Similarly, using this material for the casing for the acoustic equipment of Example 7, a sample 7 was fabricated as a sample of the casing for the acoustic equipment of Example 7.

EXAMPLE 8

A material for a casing for an acoustic material of Example 8 was fabricated in the same way as in Example 7 except kneading polypropylene and the above filler at a mixing ratio of polypropylene to the filler of 100 parts by weight of polypropylene to 30 parts by weight of the filler. Similarly, using this material for the casing for the acoustic equipment of Example 8, a sample 8 was fabricated as a sample of the casing for the acoustic equipment of Example 8.

EXAMPLE 9

A material for a casing for an acoustic material of Example 9 was fabricated in the same way as in Example 7 except kneading polypropylene and the above filler at a mixing ratio of polypropylene to the filler of 100 parts by weight of polypropylene to 50 parts by weight of the filler. Similarly, using this material for the casing for the acoustic equipment of Example 9, a sample 9 was fabricated as a sample of the casing for the acoustic equipment of Example 9.

COMPARATIVE EXAMPLE 1

In comparative Example 1, an ABS resin manufactured by NIPPON GOSEI GOMU-SHA under the trade name of ABS10 itself was used without mixing with the filler of the above-described Examples. Similarly, using the material for the casing for the acoustic material of Comparative Example 1, a comparative sample 1 was fabricated as a sample of the casing of the acoustic material according to Comparative Example 1.

COMPARATIVE EXAMPLE 2

In comparative Example 2, polypropylene manufactured by TOKUYAMA-SHA under the trade name of MS670 itself was used without mixing with the filler of the above-described Examples. Similarly, using the material for the casing for the acoustic material of Comparative Example 2, a comparative sample 2 was fabricated as a sample of the casing of the acoustic material according to Comparative Example 2.

COMPARATIVE EXAMPLE 3

A material for a casing for an acoustic material of Comparative Example 3 was fabricated in the same way as in Example 1 except preparing a filler using calcium carbonate in place of the inorganic pigment and kneading polypropylene manufactured by TOKUYAMA-SHA under the trade name of MS670 and the filler at a ratio of 100 parts by weight of polypropylene to 10 parts by weight of the filler. Similarly, using the material for the casing for the acoustic material of Comparative Example 3, a comparative sample 3 was fabricated as a sample of the casing of the acoustic material according to Comparative Example 3.

COMPARATIVE EXAMPLE 4

A material for a casing for an acoustic material of Comparative Example 4 was fabricated in the same way as in Comparative Example 3 except kneading polypropylene and a filler composed of calcium carbonate at a mixing ratio of polypropylene to the filler of 100 parts by weight of polypropylene to 30 parts by weight of the filler. Similarly, using this material for the casing for the acoustic equipment of Comparative Example 4, a comparative sample 4 was fabricated as a sample of the casing for the acoustic equipment of Comparative Example 4.

COMPARATIVE EXAMPLE 5

A material for a casing for an acoustic material of Comparative Example 5 was fabricated in the same way as in Comparative Example 3 except kneading polypropylene and a filler composed of calcium carbonate at a mixing ratio of polypropylene to the filler of 100 parts by weight of polypropylene to 50 parts by weight of the filler. Similarly, using this material for the casing for the acoustic equipment of Comparative Example 5, a comparative sample 5 was fabricated as a sample of the casing for the acoustic equipment of Comparative Example 5.

COMPARATIVE EXAMPLE 6

As a material for a casing for an acoustic equipment of Comparative Example 6, a commercial composite material of polypropylene manufactured by TOKUYAMA-SHA under a trade name of LJ666 was used. This composite material of polypropylene contains 30% of husks of grains. Using this material for the casing for the acoustic equipment of Comparative Example 6, a comparative sample 6 was fabricated as a sample of the casing for the acoustic equipment of Comparative Example 6. In the Comparative Example 6, the molding temperature was 200° C.

COMPARATIVE EXAMPLE 7

A particle board 3 mm in thickness was used as a material for a casing for an acoustic equipment of Comparative Example 7.

Experiments for Evaluation of Physical Properties

The following experiments on the physical properties were conducted in connection with the Examples 1 to 9 and Comparative Examples 1 to 7.

The physical properties of the samples fabricated using the Examples and Comparative Examples were measured using a vibration reed method, in which each sample was subjected to vibrations, with an end in the longitudinal direction of each sample being secured in a cantilevered fashion, in order to find the resonant frequency. With the vibration reed method, the dynamic modulus of elasticity is found from the resonant frequency and the internal loss is found from the resonance frequency. The measured results of the vibration reed method are shown in Table 1 and the amounts of addition of the filler in the Examples 1 to 3 and in the Comparative Example 1 are shown in Table 2.

TABLE 1

| | dynamic modulus of elasticity (GPa) | specific gravity | sound velocity (m/sec) | tan δ |
|---|---|---|---|---|
| Ex. 1 | 1.97 | 1.08 | 1560 | 1.55 * 10−2 |
| Ex. 2 | 2.63 | 1.15 | 1995 | 2.07 * 10−2 |
| Ex. 3 | 3.08 | 1.21 | 2136 | 2.51 * 10−2 |
| Ex. 4 | 2.63 | 0.99 | 1560 | 8.65 * 10−2 |
| Ex. 5 | 4.3 | 1.08 | 1995 | 8.55 * 10−2 |
| Ex. 6 | 5.48 | 1.2 | 2136 | 8.60 * 10−2 |
| Ex. 7 | 3.04 | 0.97 | 1770 | 8.68 * 10−2 |
| Ex. 8 | 4.57 | 1.05 | 2086 | 8.70 * 10−2 |
| Ex. 9 | 5.6 | 1.18 | 2178 | 8.72 * 10−2 |
| Comp. Ex. 1 | 1.69 | 1.03 | 1249 | 1.25 * 10−2 |
| Comp. Ex. 2 | 1.47 | 0.91 | 1249 | 8.70 * 10−2 |
| Comp. Ex. 3 | 2.13 | 1.02 | 1445 | 8.27 * 10−2 |
| Comp. Ex. 4 | 3.91 | 1.13 | 1860 | 7.70 * 10−2 |
| Comp. Ex. 5 | 5.2 | 1.35 | 1962 | 6.92 * 10−2 |
| Comp. Ex. 6 | 1.94 | 1.07 | 1346 | 8.52 * 10−2 |
| Comp. Ex. 7 | 1.8 | 0.78 | 1490 | 7.66 * 10−2 |

TABLE 2

| samples | fillers | ABS |
| --- | --- | --- |
| Comp. Ex. 1 | 0 part by weight | 100 pars by weight |
| Ex. 1 | 5 parts by weight | 100 pars by weight |
| Ex. 2 | 10 parts by weight | 100 pars by weight |
| Ex. 3 | 20 parts by weight | 100 pars by weight |

As may be seen from Tables 1 and 2, the dynamic modulus of elasticity of examples employing the material for the casing for the acoustic material of the Examples are improved over that of the samples employing the material for the casing for the acoustic material of the Comparative Examples. The dynamic modulus of elasticity is also improved with increasing amounts of addition of the filler in the Examples without regard to the resin type. Moreover, the samples of the Examples are seen to be improved in sound velocity. From this it is seen that the fillers of the Examples are stable in shape while being excellent in dispersion properties.

Similarly, the samples employing the materials for the casing for the acoustic equipments of the Examples are improved in the value of tan δ as compared to the samples employing the materials for the casing for the acoustic equipments of the Comparative Examples. From this it is seen that the samples of the Examples manifest higher internal losses. It is also seen from comparison with Comparative Example 3 that the value of tan δ is higher with the use of the inorganic pigments than that with the use of calcium carbonates. This is ascribable to the fact that the internal loss of the filler employing calcium carbonates is rather low, whereas that of the filler of the present invention is high because the filler of the present invention is of a wooden structure.

Using the material for the casing for the acoustic equipments of comparative Example 6, a sample was produced at 200° C. It was seen that the sample suffered from scorching and poor surface properties, while decomposed gases are evolved. Conversely, the samples molded from the materials for the casing for the acoustic equipments of the Examples suffered from no yellowing nor scorching. Also, with the use of the materials for the casing for the acoustic equipments of the Examples, the samples showed good surface properties. It is seen from this that a high-quality casing for an acoustic equipment can be prepared without placing limitations on the molding conditions.

Experiments for Evaluating Acoustic Characteristics

An acoustic equipment was manufactured using the casing for an acoustic equipment according to the present invention for evaluating its acoustic characteristics.

The material for the casing for the acoustic equipment used here was manufactured in the same way as in Example 1 except adding 20 wt % of the filler used in Example 1 to the ABS resin as shown in the above experimental example 3. The speaker device 1 shown in FIG. 1 was prepared using this material for the casing for the acoustic equipment. The main speaker body portion of the speaker device 1 was 16 cm in diameter.

For comparison, a similar speaker was manufactured using an ABS resin not containing the filler of the present invention.

Figure 2:
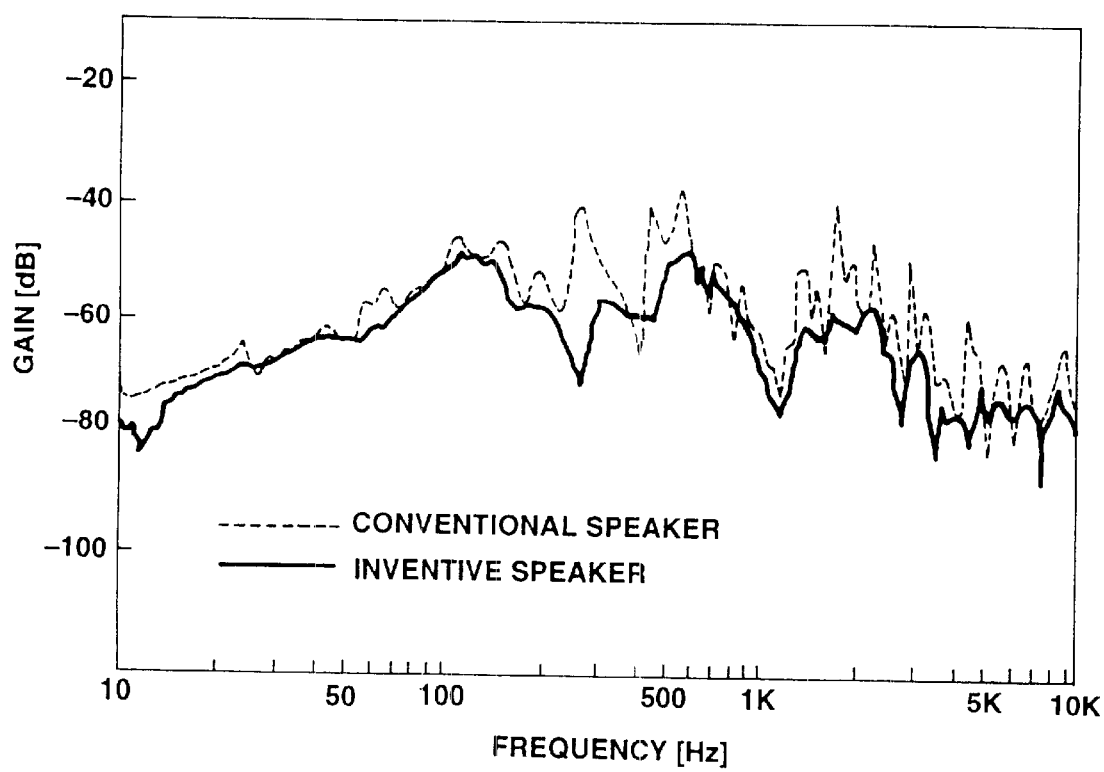
FIG. 2 is a graph showing frequency response of the speaker shown in FIG. 1 and a conventional speaker.

A sine wave was entered as an input signal to each speaker and the speed of vibrations of the outer casing 3 in FIG. 1 was measured. The speed of vibrations at this time was measured using a laser Doppler vibration meter. FIG. 2 shows the measured results of the vibration speeds of the speakers.

As may be seen from FIG. 2, an outer casing of the speaker device as the casing of an acoustic equipment according to the present invention suffers from gain fluctuations by the frequency response to a lesser extent than that of the speaker as the conventional equipment. From this it may be seen that the casing of an acoustic equipment according to the present invention has a higher internal losses thus suffering from the vibrations generated by the acoustic equipment only to a lesser extent.

It is seen from the above-described results of the tests for evaluating physical properties and acoustic properties that the sound pressure frequency characteristics or the distortion factor of the acoustic equipment can be improved with the use of the material for the casing for the acoustic equipment and the casing for the acoustic equipment according to the present invention.

In addition to the resins shown in the Examples, such as ABS, any resin melting at 230° C. or lower can be used. In the above Examples, a filler is kneaded at a proportion of 5 to 30 parts by weight to the synthetic resin material. It is noted that the proportion of the filler kneaded with the synthetic resin material is determined taking into account the relative ease with which the synthetic resin material kneaded with the filler flows into a metal mold at the time of injection molding. If this proportion exceeds a maximum value of 50 parts by weight, synthetic resin material kneaded with the filler can hardly flow into the metal mold for injection molding. As the case may be, the synthetic resin material kneaded with the filler becomes unable to flow into the mold. Thus, the proportion of the filler is desirably not larger than 50 parts by weight. If the proportion of mixing the filler is not higher than 50 parts by weight, the effect in improving characteristics as shown in Table 1 or FIG. 2 by the mixing of the filler is not realized. Therefore, the proportion of mixing the filler is desirably not lower than 5 parts by weight. Preferably, the proportion of the filler kneaded with the synthetic resin material is 5 to 30 parts by weight because then the favorable properties as shown in Table 1 or FIG. 2 can be realized while assuring flowing of the synthetic resin material kneaded with the filler.

According to the present invention, as described above, such a material can be provided which is composed of a synthetic resin material kneaded with a filler comprised of a cellulose-based powdered material on the surface of which is immobilized a hard fine powdered material smaller in particle size than the cellulose-based powdered material, with the material having superior internal losses and modulus of elasticity, such that a casing for an acoustic equipment having superior frequency response can be provided with the use of the material.

What is claimed is:

1. An injection molding material of a casing of an acoustic device, the material composed of a filler and a thermosetting resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in size than said particles of cellulose-based powdered material, said particles of fine powdered material deposited to the surfaces under a pre-set pressure to prevent exfoliation of the particles of cellulose-based powdered material, said material has a ratio of filler to thermosetting resin of 50 percent or less parts by weight.

2. The material of a casing of an acoustic device as claimed in claim 1 wherein said cellulose-based powdered material comprises wooden powders.

3. The material of a casing of an acoustic device as claimed in claim 1 wherein said fine powdered material is an inorganic material.

4. The material of a casing of an acoustic device as claimed in claim 3, wherein said inorganic material is one selected from the group consisting of calcium carbonate, titanium oxide and mica.

5. The material for a casing of an acoustic device as claimed in claim 1 wherein said filler is kneaded at a proportion not higher than 50 parts by weight to said thermosetting resin.

6. The material of a casing of an acoustic device as claimed in claim 1 wherein said filler is kneaded at a proportion of 5 to 30 parts by weight to said thermosetting resin.

7. An injection molding material of a casing of an acoustic device, the material composed of a filler and a thermoplastic resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of cellulose-based powdered material, said particles of fine powdered material deposited to the surfaces under a pre-set pressure to prevent exfoliation of the particles of cellulose-based powdered material, said material has a ratio of filler to thermoplastic resin of 5–30 percent parts by weight.

8. The material of a casing of an acoustic device as claimed in claim 7 wherein said cellulose-based powdered material comprises wooden powders.

9. The material of a casing of an acoustic device as claimed in claim 1 wherein said fine powdered is an inorganic material.

10. The material of a casing of an acoustic device as claimed in claim 9, wherein said inorganic material is selected from the group consisting of calcium carbonate, titanium oxide and mica.

11. A speaker unit comprising:
a speaker; and
an injection molded casing housing the speaker and which is obtained by molding a starting material composed of a filler and a thermosetting resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of cellulose-based powdered material, said particles of fine powdered material deposited to the surfaces under a pre-set pressure to prevent exfoliation of the particles of cellulose-based powdered material, said material has a ratio of filler to thermosetting resin of 50 percent or less parts by weight.

12. The speaker unit of claim 11 wherein said cellulose-based powdered material comprises wooden powders.

13. The speaker unit of claim 11 wherein said fine powdered material is an inorganic material.

14. The speaker unit of claim 11 wherein said inorganic material is selected from the group consisting of calcium carbonate, titanium oxide and mica.

15. The speaker unit of claim 11 wherein said filler is kneaded at a proportion of 5 to 30 parts by weight to said thermosetting resin.

16. A speaker unit comprising:
a speaker; and
an injection molded casing housing the speaker and which is obtained by molding a starting material composed of a filler and a thermoplastic resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of cellulose-based powdered material, said particles of fine powdered material deposited to the surfaces under a pre-set pressure to prevent exfoliation of the particles of cellulose-based powdered material, said material has a ratio of filler to thermoplastic resin of 5–30 percent parts by weight.

17. The speaker unit of claim 16 wherein said cellulose-based powdered material comprises wooden powders.

18. The speaker unit of claim 16 wherein said fine powdered material is an inorganic material.

19. The speaker unit of claim 16 wherein said inorganic material is selected from the group consisting of calcium carbonate, titanium oxide and mica.

20. The material of a casing of an acoustic device of claim 1, wherein the acoustic device is a speaker and the casing is an enclosure for the speaker.

21. The material of a casing of an acoustic device of claim 7, wherein the acoustic device is a speaker and the casing is an enclosure for the speaker.

22. An injection molded material for a casing of an acoustic device, said material composed of a filler and a thermoplastic resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of powdered material, said particles of fine powdered material deposited to the surfaces under a pre-set pressure to prevent exfoliation of the particles of cellulose-based powdered material, said particles of fine powdered material selected from the group consisting of calcium carbonate, titanium oxide and mica, said cellulose material comprising wood powders, said filler being kneaded at a proportion to said thermoplastic resin not higher than 50 percent parts by weight.

23. An injection molded material for a casing of an acoustic device, said material composed of a filler and a thermosetting resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of powdered material, said particles of fine powdered material deposited to the surfaces under a pre-set pressure to prevent exfoliation of the particles of cellulose-based powdered material, said particles of fine powdered material selected from the group consisting of calcium carbonate, titanium oxide and mica, said cellulose material comprising wood powders, said filler being kneaded at a proportion to said thermosetting resin of 5–30 percent parts by weight.

24. A speaker unit comprising:

a speaker; and an injection molded casing housing the speaker, said casing composed of a filler and a thermoplastic resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of powdered material, said particles of fine powdered material deposited to the surfaces under a pre-set pressure to prevent exfoliation of the particles of cellulose-based powdered material, said particles of fine powdered material selected from the group consisting of calcium carbonate, titanium oxide and mica, said cellulose material comprising wood powders, said filler being kneaded at a proportion to said thermoplastic resin not higher than 50 percent parts by weight.

25. A speaker unit comprising:

a speaker; and an injection molded casing housing the speaker, the injection molded casing composed of a filler and a thermosetting resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of powdered material, said particles of fine powdered material deposited to the surfaces under a pre-set pressure to prevent exfoliation of the particles of cellulose-based powdered material, said particles of fine powdered material selected from the group consisting of calcium carbonate, titanium oxide and mica, said cellulose material comprising wood powders, said filler being kneaded at a proportion to said thermosetting resin of 5–30 percent parts by weight.

26. A speaker unit comprising:

a speaker; and an injection molded casing housing the speaker, said casing composed of a filler and a thermosetting resin, said filler comprising particles of a cellulose-based powdered material which causes said casing to have a higher internal vibration loss than if said cellulose based powder was not present, the cellulose powdered material having surfaces on which are immobilized particles of a fine powdered material harder and smaller in particle size than said particles of powdered material, said particles of fine powdered material deposited to the surfaces under a pre-set pressure to prevent exfoliation of the particles of cellulose-based powdered material, said particles of fine powdered material selected from the group consisting of calcium carbonate, titanium oxide and mica, said cellulose material comprising wood powders, said filler being kneaded at a proportion to said thermosetting resin of not more than 50 percent parts by weight.

27. A speaker unit comprising:

a speaker; and an injection molded casing housing the speaker and having a filler, said filler comprising particles of a cellulose-based powdered material which cause said casing to have a higher internal vibration loss than if said cellulose-based powder was not present, the cellulose powdered material having surfaces on which are immobilized particles of a fine powdered material harder and smaller in particle size than said particles of powdered material, said particles of fine powdered material deposited to the surfaces under a pre-set pressure to prevent exfoliation of the particles of cellulose-based powdered material, said particles of fine powdered material selected from the group consisting of calcium carbonate, titanium oxide and mica, said cellulose material comprising wood powders, said filler being kneaded at a proportion to said thermoplastic resin of 5–30 percent parts by weight.

* * * * *

UNITED STATES PATENT AND TRADEMARK OFFICE
CERTIFICATE OF CORRECTION

PATENT NO.    : 6,686,036 B1
DATED         : February 3, 2004
INVENTOR(S)   : Kunihiko Tokura, Masaru Uryu and Masayuki Kamite.

It is certified that error appears in the above-identified patent and that said Letters Patent is hereby corrected as shown below:

<u>Title page,</u>
Item [73], Assignee, "Sony Corporation, Tokyo (JP)" should be
-- Sony Corporation, Tokyo (JP) and Misawa Homes Co. Ltd. Tokyo (JP) --

Signed and Sealed this

Twenty-ninth Day of June, 2004

JON W. DUDAS
*Acting Director of the United States Patent and Trademark Office*